(12) United States Patent
Chen et al.

(10) Patent No.: US 10,250,598 B2
(45) Date of Patent: Apr. 2, 2019

(54) LIVENESS DETECTION METHOD AND DEVICE, AND IDENTITY AUTHENTICATION METHOD AND DEVICE

(71) Applicant: Alibaba Group Holding Limited, Grand Cayman (KY)

(72) Inventors: Jidong Chen, Hangzhou (CN); Liang Li, Hangzhou (CN)

(73) Assignee: ALIBABA GROUP HOLDING LIMITED, Grand Cayman (KY)

( * ) Notice: Subject to any disclaimer, the term of this patent is extended or adjusted under 35 U.S.C. 154(b) by 182 days.

(21) Appl. No.: 15/176,515

(22) Filed: Jun. 8, 2016

(65) Prior Publication Data

US 2016/0366129 A1    Dec. 15, 2016

(30) Foreign Application Priority Data

Jun. 10, 2015  (CN) .......................... 2015 1 0315782

(51) Int. Cl.
*H04L 29/06* (2006.01)
*G06K 9/00* (2006.01)
*G06F 21/32* (2013.01)

(52) U.S. Cl.
CPC .......... *H04L 63/0861* (2013.01); *G06F 21/32* (2013.01); *G06K 9/00255* (2013.01);
(Continued)

(58) Field of Classification Search
CPC ............ H04L 63/0861; G06K 9/00906; G06K 9/00315; G06K 9/00912; G06K 9/00255; G06F 21/32
See application file for complete search history.

(56) References Cited

U.S. PATENT DOCUMENTS 8,355,530 B2  1/2013  Park et al.
8,787,628 B1  7/2014  Derakhshani et al.
(Continued)

FOREIGN PATENT DOCUMENTS

EP  1715443 A2  10/2006
EP  2560123 A1  2/2013
(Continued)

OTHER PUBLICATIONS

International Search Report & Written Opinion to corresponding International Application No. PCT/US2016/036547, dated Sep. 1, 2016.

(Continued)

*Primary Examiner* — Tri M Tran
(74) *Attorney, Agent, or Firm* — James J. DeCarlo; Greenberg Traurig, LLP

(57) ABSTRACT

Liveness detection and an identity authentication is included in the disclosure. A user's biological characteristic information is collected and displayed at an initial position on a screen of a computing device. A target position is determined using the initial position, and the target position is displayed on the screen. The user is prompted to move the user's biological characteristic information to cause the displayed biological characteristic to move from the initial position on the screen to the target position on the screen. The user's movement is detected and the display position of the displayed biological characteristic information is determined using the detected user's movement; a judgment is made whether the user is a living being using a relationship between the determined display position and the target position. The biological characteristic information of a living being can be verified, e.g., when the user logs in, thereby improving security.

17 Claims, 10 Drawing Sheets

(52) U.S. Cl.
CPC ..... *G06K 9/00315* (2013.01); *G06K 9/00906* (2013.01); *G06K 9/00912* (2013.01)

(56) References Cited

U.S. PATENT DOCUMENTS

| | | | |
|---|---|---|---|
| 8,856,541 | B1 | 10/2014 | Chaudhury et al. |
| 8,948,464 | B2 | 2/2015 | Hama et al. |
| 8,958,607 | B2 | 2/2015 | Juveneton et al. |
| 8,983,146 | B2 | 3/2015 | Friedman et al. |
| 9,020,213 | B1 | 4/2015 | Ionita |
| 9,082,011 | B2 | 7/2015 | Komogortsev |
| 9,104,921 | B2 | 8/2015 | Derakhshani et al. |
| 9,202,119 | B2 | 12/2015 | Sezille |
| 2007/0211925 | A1* | 9/2007 | Aoki ................. G06K 9/00255 382/118 |
| 2009/0207251 | A1* | 8/2009 | Kobayashi ......... G06K 9/00597 348/156 |
| 2012/0235790 | A1* | 9/2012 | Zhao ..................... G06F 21/32 340/5.83 |
| 2013/0044055 | A1* | 2/2013 | Karmarkar ............. G06F 3/013 345/158 |
| 2013/0188840 | A1 | 7/2013 | Ma et al. |
| 2014/0270412 | A1 | 9/2014 | Ma et al. |
| 2014/0337948 | A1 | 11/2014 | Hoyos |
| 2015/0095996 | A1 | 4/2015 | Tang |
| 2015/0104081 | A1 | 4/2015 | Ionita |
| 2015/0205994 | A1* | 7/2015 | Yoo ........................ G04G 21/00 368/223 |
| 2015/0205996 | A1 | 7/2015 | Ionita |

FOREIGN PATENT DOCUMENTS

| | | | |
|---|---|---|---|
| JP | 2003317100 A | 11/2003 | |
| JP | 2015503866 A | 2/2015 | |
| WO | 2014184436 A1 | 11/2014 | |
| WO | WO 2014184436 A1 * | 11/2014 | ............. G06F 21/32 |

OTHER PUBLICATIONS

Extended European Search Report to corresponding EP Application No. 16808238.6 dated Jan. 3, 2019 (11 pages).

Frischholz et al., "Avoiding replay-attacks in a face recognition system using head-pose estimation," IEEE International Workshop on Analysis and Modeling of Faces and Gestures (AMFG 2003), IEEE, Oct. 17, 2003 (2 pages).

Werner et al., "Biological Information—What is it?" In: "Biological Information," World Scientific, Jul. 2013 (15 pages).

* cited by examiner

LIVENESS DETECTION METHOD AND DEVICE, AND IDENTITY AUTHENTICATION METHOD AND DEVICE

CROSS REFERENCE TO RELATED APPLICATION

This application claims the benefit of Chinese Patent Application No. 201510315782.2, entitled "Liveness Detection Method And Device, And Identity Authentication Method And Device", filed Jun. 10, 2015, which is hereby incorporated by reference herein in its entirety.

FIELD OF THE DISCLOSURE

The present disclosure relates to the technical field of secure verification, and in particular relates to a liveness detection method and device, and an identity authentication method and device.

BACKGROUND

Traditional identity authentication is based on accounts and passwords, but the passwords are easily forgotten and leaked. Because of this, traditional password-based identity authentication is subject to more and more problems. Biological identification technology, represented by fingerprint and face recognition, is replacing traditional password-based identity authentication in various areas. However, using face-based authentication as an example, unauthorized users may imitate an authorized user using a photograph of them, thus security risks are present in conventional biological identification technology.

SUMMARY

The present disclosure seeks to address failings in the art and to provide a liveness detection method, wherein the method is capable of identifying whether a user is a living being, such that during identity authentication of the user, the biological characteristic information of a living being is only verified, which improves security.

In accordance with at least one aspect of the present disclosure, an identity authentication method is provided, which improves security during the authentication. In accordance with at least one embodiment of the present disclosure, another aspect provides a liveness detection device. In accordance with yet another aspect of the present disclosure is an identity authentication device.

A liveness detection method according to a first aspect of embodiments of the present disclosure comprises collecting, by a computing device, biological characteristic information of a user; displaying, by the computing device, the collected biological characteristic information at an initial position on a screen of the computing device; determining, by the computing device, a target position using the initial position, and displaying the target position on the screen; prompting, by the computing device, the user to move the user's biological characteristic information to cause the displayed biological characteristic to move from the initial position on the screen to the target position on the screen; detecting, by the computing device, the user's biological characteristic information movement, and determining the display position of the displayed biological characteristic information using the detected user's movement; and judging, by the computing device, whether the user is a living being using a relationship between the determined display position and the target position.

In the liveness detection method according to the first aspect of embodiments of the present disclosure, by mapping the biological characteristic information to the display position on the screen, and based on the relationship between the display position and the target position, a determination can be made whether or not a user is a living being. In addition and during user identity authentication, the biological characteristic information of a living being can be used to for authenticating the user, which improves security.

An identity authentication method according to a second aspect of embodiments of the present disclosure comprises upon receiving an identity authentication instruction of a user, a computing device collecting biological characteristic information of the user; judging, by the computing device, whether the user is a living being according to the collected biological characteristic information; if the user is judged to be a living being, the computing device sending the collected biological characteristic information of the user to an authentication server; receiving, by the computing device and from the authentication server, an identity authentication result of a comparison of the collected biological characteristic information with prestored biological characteristic information corresponding to the user; the judging, by the computing device, whether the user is a living being comprising: displaying at least a portion of the collected biological characteristic information at an initial position on a screen of the computing device; determining a target position using the initial position, and displaying the target position on the screen; prompting the user to move the user's biological characteristic information to cause the displayed biological characteristic to move from the initial position on the screen to the target position on the screen; detecting the user's biological characteristic information movement, and determining the display position of the displayed biological characteristic information using the detected user's movement; and judging whether the user is a living being using a relationship between the determined display position and the target position.

In accordance with the identity authentication method according to the second aspect of embodiments of the present disclosure, liveness detection can be performed before identity authentication. When the user is determined to be a living being, further verification can be performed. Spoofing of verification information in the form of photos and the like is prevented, and security during the authentication improved.

A liveness detection device according to a third aspect of embodiments of the present disclosure comprises a first displaying module collecting biological characteristic information of a user, and displaying the collected biological characteristic information at an initial position on a screen of a computing device; a second displaying module determining a target position using the initial position, and displaying the target position on the screen; a prompting module prompting the user to move the user's biological characteristic information to cause the displayed biological characteristic to move from the initial position on the screen to the target position on the screen; and a judging module detecting the user's biological characteristic information movement, determining the display position of the displayed biological characteristic information using the detected user's movement, and judging whether the user is a living being using a relationship between the determined display position and the target position.

In the liveness detection device according to the third aspect of the embodiments of the present disclosure, by mapping the biological characteristic information to the display position on the screen, and based on the relationship between the display position and the target position, a determination can be made whether or not a user is a living being. In addition and during user identity authentication, the biological characteristic information of a living being can be used to for authenticating the user, which improves security.

An identity authentication device according to a fourth aspect of embodiments of the present disclosure comprises an acquiring module, upon receiving an identity authentication instruction of a user, collecting biological characteristic information of the user; a judging module judging whether the user is a living being according to the collected biological characteristic information; a sending module, if the judging module judges that the user is a living being, sending the collected biological characteristic information of the user to an authentication server; a receiving module receiving, from the authentication server, an identity authentication result of a comparison of the collected biological characteristic information with prestored biological characteristic information corresponding to the user; the judging module judging whether the user is a living being according to the collected biological characteristic information comprising: the judging module displaying at least a portion of the collected biological characteristic information at an initial position on a screen of the computing device; the judging module determining a target position using the initial position, and displaying the target position on the screen; the judging module prompting the user to move the user's biological characteristic information to cause the displayed biological characteristic to move from the initial position on the screen to the target position on the screen; the judging module detecting the user's biological characteristic information movement, and determining the display position of the displayed biological characteristic information using the detected user's movement; and the judging module judging whether the user is a living being using a relationship between the determined display position and the target position.

In the identity authentication device according to the fourth aspect of the embodiments of the present disclosure, liveness detection can be performed before identity authentication. When the user is determined to be a living being, further verification can be performed. Spoofing of verification information in the form of photos and the like is prevented, and security during the authentication improved.

Additional aspects and advantages of the present disclosure are further illustrated in the following description.

DRAWINGS

The above described and/or additional aspects and advantages of the present disclosure will become more apparent with reference to the following description taken in conjunction with the accompanying drawings.

DETAILED DESCRIPTION

Figure 1:
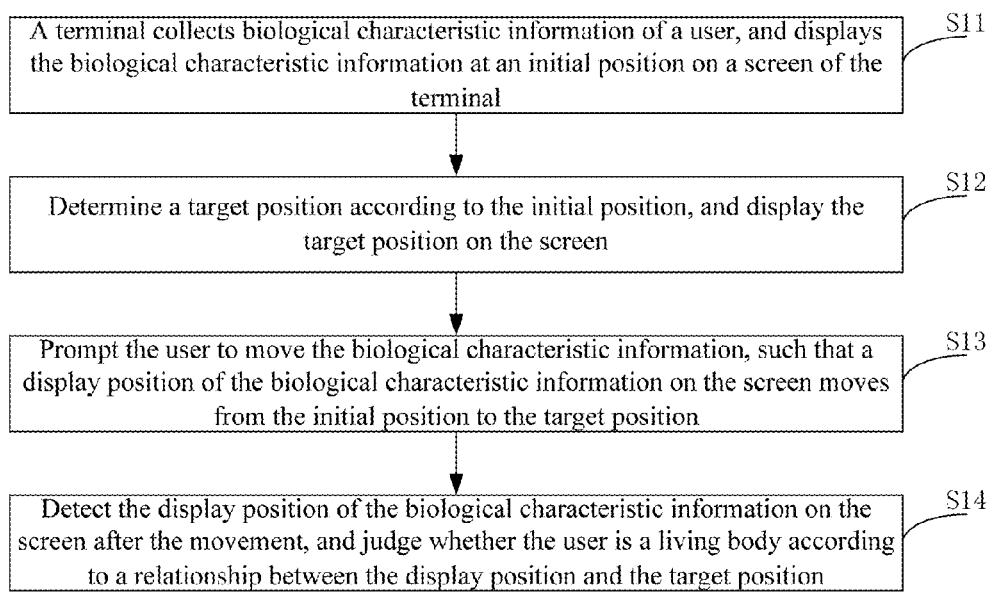
FIG. 1 is a schematic flowchart illustrating a liveness detection method according to an embodiment of the present disclosure.

The embodiments of the present disclosure are described in detail hereinafter. Examples of the described embodiments are given in the accompanying drawings, wherein the identical or similar reference numerals denote identical or similar modules or modules having identical or similar functions. The specific embodiments described with reference to the attached drawings are all exemplary, and are intended to illustrate and understand the present disclosure, which shall not be construed as limitations to the present disclosure. On the contrary, the embodiments of the present disclosure cover all the variations, modifications and equivalents made within the spirit and scope as defined by the appended claims of the present disclosure.

FIG. 1 is a schematic flowchart illustrating a liveness detection method according to an embodiment of the present disclosure. The method may be performed by a terminal. In accordance with the method shown in FIG. 1, in S11, a terminal collects biological characteristic information of a user, and displays the biological characteristic information at an initial position on a screen of the terminal.

In this embodiment, facial characteristic information is used as an example of biological characteristic information. It is to be understood that the biological characteristic information is not limited to facial characteristic information, and may be other biological characteristic information, such as fingerprints, palm prints, irises or the like.

In accordance with at least one embodiment, using facial gesture information as an example, the facial gesture information is indicated by pitch, roll and yaw, wherein pitch denotes an angle of pitch, roll denotes an angle of rotation, and yaw denotes an angle of oscillation.

Figure 2:
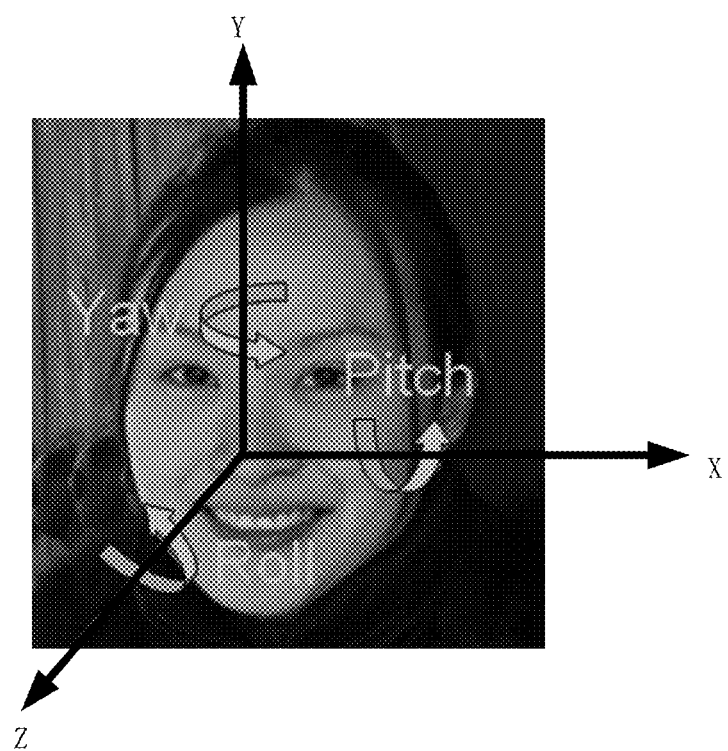
FIG. 2 is a schematic diagram illustrating a first coordinate system according to an embodiment of the present disclosure.

For example and with reference to FIG. 2, a coordinate system where the face is located may be referred to as a first coordinate system, which is a three-dimensional coordinate system. Assume that the head of a person is taken as a three-dimensional sphere, then the central point of the sphere may be selected as the coordinate origin of the first coordinate system. The three coordinate axis of the first coordinate system are respectively X-axis, Y-axis and Z-axis, wherein the positive direction of the X-axis is horizontal and to the right, the positive direction of Y-axis is vertical and upward, and the positive direction of Z-axis is the direction in which human eyes are looking forward. Within the first coordinate system as illustrated in FIG. 2, when the face faces the front horizontally, the pitch, roll and yaw in the face gesture information are all 0 degrees.

Figure 3:
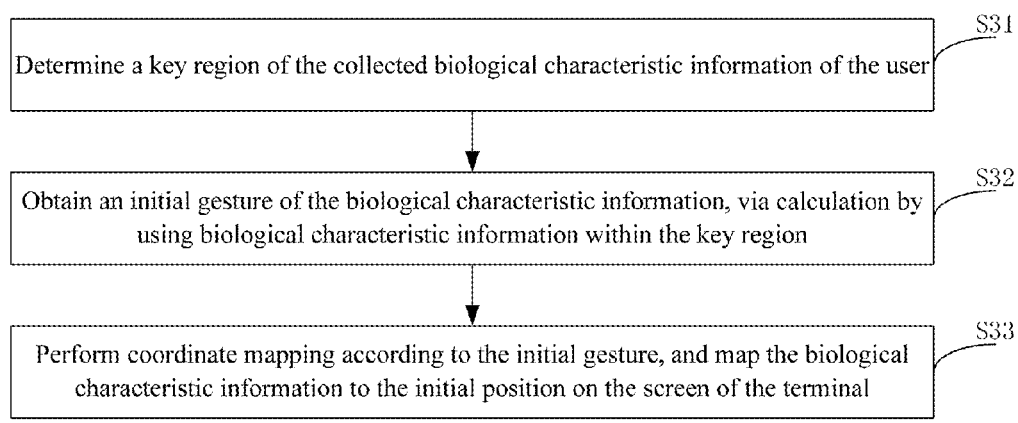
FIG. 3 is a schematic flowchart illustrating displaying biological characteristic information at an initial position on a screen of a terminal according to an embodiment of the present disclosure.

FIG. 3 further illustrates the display of biological characteristic information at an initial position on a screen of the terminal in accordance with one or more embodiments. In S31, a key region of collected biological characteristic information of the user is determined. Using the case in which the biological characteristic information is facial characteristic information as an example, a camera of the terminal may be used to capture one or more images of the user's face to obtain the one or more images of the user's face.

For example, when the user enters a login interface that uses face information, the system automatically captures, or prompts the user to manually capture, a number of face pictures, or images. As discussed above, the number of face pictures, or images, can be one or more, for example.

Afterwards, a face region is detected from the face picture(s) using a face detection algorithm. The face detection algorithm may be an existing algorithm, such as and for example, a face detection algorithm based on a cascade classifier comprising plurality of functions connected in a series. Assume for the sake of an example that the cascade classifier comprises a first function, a second function and the like, some of the pictures may be eliminated by the first function, with the remaining image(s) not eliminated by the first function being evaluated using the second function, which may eliminate some of the remaining pictures, and so on. Using a cascade classifier comprising a plurality of functions connected in a series, images that do not include an image of a face are eliminated and the remaining image(s) include a facial image. It may be understood that a conventional cascade classifier can be used in connection with embodiments of the present disclosure.

After a face region is detected, the face region is identified as a key region.

In S32, an initial gesture of the biological characteristic information is obtained via calculation using biological characteristic information within the key region.

Face gesture estimation is performed with respect to the face region to acquire an initial gesture of the face, wherein the initial gesture comprises an initial value of at least one angle of a pitch, a roll and a yaw.

After the face region is detected, key points in the face region may be obtained using a face key point positioning algorithm. Key points of a face are characteristic points of the face, such as eyes, a nose, a mouth, and the like. The face key point positioning algorithm can use a method of machine learning comprising a training stage and a positioning stage. In the training stage, a regression machine is trained to estimate face key point coordinates using a training data set of face key point coordinates and corresponding face pictures. In the positioning stage, face key point coordinates are estimated from input face pictures using the trained regression machine. Any suitable face key point positioning algorithm may be used with embodiments of the present disclosure.

After face key points are positioned, a three-dimensional sphere corresponding to a person's head is estimated using the face key points and a three-dimensional head modeling algorithm. Any suitable three-dimensional modeling algorithm may be used with embodiments of the present disclosure. For example, a three-dimensional modeling based on a single picture, a real-time three-dimensional modeling and the like may be used with embodiments of the present disclosure. After the three-dimensional sphere is estimated, an angle of rotation relative to the X-axis is a pitch, an angle of rotation relative to the Y-axis is a yaw, and an angle of rotation relative to the Z-axis is a roll. Initial gesture information is thereby obtained.

In S33, a coordinate mapping is performed according to the initial gesture information, and the biological characteristic information is mapped to the initial position on the screen of the terminal.

Optionally, the coordinate mapping is performed according to the initial gesture information, and the mapping of the biological characteristic information to the initial position on the screen of the terminal comprises acquiring a mapping relationship between coordinates within a first coordinate system and coordinates within a second coordinate system, wherein the first coordinate system is a coordinate system where the biological characteristic information is located, and the second coordinate system is a coordinate system where the screen is located, determining coordinates of the initial position corresponding to the initial gesture according to the mapping relationship; and mapping the biological characteristic information to the initial position according to the coordinates of the initial position.

Both the initial position and the display position after the subsequent movement of the biological characteristic information may be obtained from a pre-established mapping relationship between the first coordinate system and the second coordinate system, wherein the first coordinate system is a coordinate system where the biological characteristic information is located, as illustrated in FIG. 2, and the second coordinate system is a coordinate system where the screen is located.

Figure 4:
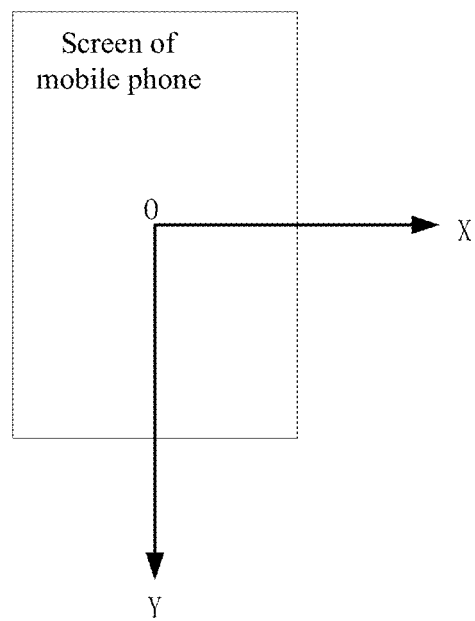
FIG. 4 is a schematic diagram illustrating a second coordinate system according to an embodiment of the present disclosure.

Referring to FIG. 4, the second coordinate system is a two-dimensional coordinate system. Using a case in which the terminal is a mobile phone as an example, the coordinate origin of the second coordinate system is a central, or center, point of the screen of the mobile phone, the two coordinate axes of the second coordinate system are respectively an X-axis and a Y-axis. The direction of X-axis is consistent with the direction of X-axis in the first coordinate system, and the positive direction of Y-axis is vertically downward.

In this embodiment, two angles of the above described three angles are used. In the two coordinate systems illustrated in FIG. 2 and FIG. 4, the mapping relationship between the two coordinate systems may be represented using the following formulae:

$$\Delta x = S_x \times \sin(\text{yaw}), \Delta y = S_y \times \sin(\text{pitch});\qquad\text{Formulae(1)}$$

In formulae (1), yaw and pitch are from the gesture information of the face information in the first coordinate system. Yaw and pitch are, respectively, an angle of oscillation and an angle of pitch. The variables $\Delta x$, $\Delta y$ are offsets of the display position of the face information on the screen relative to the coordinate origin of the second coordinate system.

The values of $S_x$, $S_y$ are determined by a variation range of the face gesture angle and the height of the screen. The values of $S_x$, $S_y$ can be obtained using the following formulae, where a screen's width and height of the screen are respectively w and h, and the coordinate origin of the coordinate system of the screen is (w/2, h/2), which is the central position of the screen, a variation range of the angle of pitch of the head is $[-\theta,+\theta]$ and a variation range of the angle of oscillation is $[-\beta,+\beta]$. The values of $\theta,\beta$ are configurable, which, in accordance with at least one embodiment, the values may be configured to be set to 45 degrees, e.g., θ=β=45°.

$$S_x = \sin(\beta) \times \frac{w}{2}, S_y = \sin(\theta) \times \frac{h}{2} \quad \text{Formulae (2)}$$

Using formulae (1) and (2), a corresponding display position (Δx,Δy) may be obtained from gesture information, e.g., yaw, pitch gesture information, and thus the position information $(O_x+\Delta x, O_y+\Delta y)$ corresponding to the status information may be obtained according to the coordinate origin $(O_x, O_y)$ of the second coordinate system.

For example, after an initial position is determined, the face information may be displayed at the initial position.

It may be understood that the above described manner of selecting a coordinate origin, and the selections of the directions of various coordinate axes in the coordinate system are not limited to the above description. Instead, other coordinate origins or coordinate axes in other directions may be used. Correspondingly, when the coordinate origin or the direction of a coordinate axis changes, the above calculation formulae may be adjusted according to a spatial geometrical relationship between the two coordinate systems.

In S12 of FIG. 1, a target position is determined according to the initial position, and the target position is displayed on the screen. The target position may be generated randomly. Generating the target position randomly reduces the probability that the target position can be predicted, which improves the accuracy of liveness detection.

Optionally, determining a target position according to an initial position comprises randomly generating a candidate target position; judging whether the candidate target position and the initial position satisfy a predetermined condition; and when the predetermined condition is satisfied, determining the candidate target position as the target position.

Figure 5:
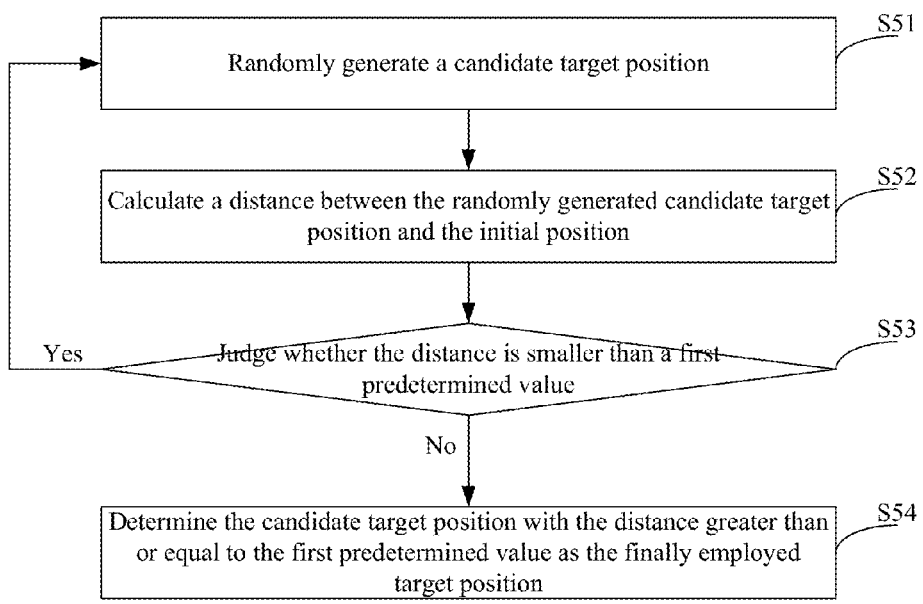
FIG. 5 is a schematic flowchart illustrating determining a target position according to an initial position according to an embodiment of the present disclosure.

In another embodiment and with reference to FIG. 5, determining a target position according to an initial position comprises steps S51-S54.

In S51, a candidate target position is randomly generated. For example, the coordinate values in the X and Y directions are randomly generated using a random coordinate value generator algorithm, and the candidate target position is defined using the randomly-generated coordinate values in the X and Y directions.

In S52, a distance between the randomly generated candidate target position and the initial position is calculated. Since the candidate target position and the initial position may each be indicated by a point within the second coordinate system, the distance between the candidate target position and the initial position may be obtained by calculating the distance between the two points in a two-dimensional plane.

In S53, a determination is made whether the distance is smaller than a first predetermined value. If it is determined, or judged, that the distance is smaller than the first predetermined value, step S51 and the subsequent steps are repeatedly performed. Otherwise, step S54 is performed. The first predetermined value may be, for example, w/2, and a judgment result may be obtained by comparing the distance with w/2.

In S54, the candidate target position with a distance from the initial position that is greater than or equal to the first predetermined value is identified as the target position to be used.

In S13 of FIG. 1, the user is prompted to move the biological characteristic information from the initial position to the target position, e.g., a display position of the biological characteristic information on the screen moves from the initial position to the target position.

After the target position is determined, e.g., determined in accordance with steps S51-S54 of FIG. 5, the terminal may display information prompting the user to move the face information displayed at the current display position to the target position by moving the user's head.

After viewing the information prompting the user to move the user's head to move the displayed image from the initial position to the target position, the user may move the user's head in order to cause the displayed image to move on the screen in response to the user's head movements.

In this embodiment, by selecting the target position where a distance between the target position and the initial position is greater than a predetermined value, the target position is distinguished from the initial position in terms of position, which makes it easier for the user to move the biological characteristic, such as the user's head, to move the displayed image from the initial position to the target position.

Figure 6:
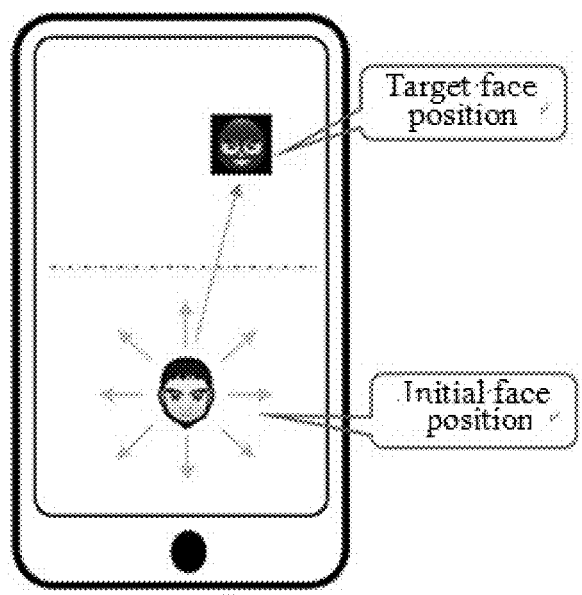
FIG. 6 is a schematic diagram illustrating an initial face position and a target face position according to an embodiment of the present disclosure.

FIG. 6 illustrates the relationship between the target position and the initial position using a face image as an example.

In S14 of FIG. 1, the display position of the biological characteristic information on the screen is detected after the movement input from the user is received, and a judgement, or determination, is made whether the user is a living being according to a relationship between the display position and the target position.

As described above, the display position of the biological characteristic information after the biological characteristic is moved on the screen by the user may be obtained using a method similar to the method for calculating the initial position.

In accordance with at least one embodiment, calculating the display position of the biological characteristic information after the biological characteristic is moved by the user comprises acquiring gesture information of the biological characteristic information after the movement within a first coordinate system; and using a pre-established mapping relationship between coordinates within a first coordinate system and coordinates within a second coordinate system to calculate coordinates within the second coordinate system corresponding to the gesture information within the first coordinate system, and determining a display position of the biological characteristic information after the movement on the screen according to the coordinates within the second coordinate system. The first coordinate system can be a coordinate system of the biological characteristic information, and the second coordinate system can be a coordinate system of the screen.

For example, when the user moves the user's head, the face gesture information may be changed. In accordance with the pre-established mapping relationship between the first coordinate system and the second coordinate system, the variable Δx, Δy may be determined using formulae (1) and (2). A display position of the face on the screen, which is variable, can be obtained using Δx, Δy and the coordinate origin.

In addition, after the display position of the face on the screen is calculated in real time, the face information may be displayed at the corresponding position according to the display information calculated in real time. In so doing, the user is able to move the face information to the target position in real time.

Using the mapping relationship between the first coordinate system and the second coordinate system, the face gesture information may be mapped to the corresponding position on the screen.

Optionally, the display position moves with the movement of the biological characteristic information by the user, wherein the movement of the biological characteristic information drives the display position to move; and judging whether the user is a living being according to a relationship between the display position and the target position comprises judging that the movement is successful when a distance between the display position and the target position is smaller than a second predetermined value, and if a number of times that the user successfully moves the biological characteristic information reaches a predetermined number of times, judging that the user is a living being.

For example, when the user moves a head image, the terminal calculates in real time a corresponding display position after the movement, and calculates in real time a distance between the display position after the movement and the target position, until the distance between these two positions is smaller than the second predetermined value. When the distance between the two positions is smaller than the second predetermined value, it indicates that the movement is successful, and the number of successful times is set to 1. If the predetermined number of times is 1, after one successful movement, it may be judged that the user is a living being.

Alternatively, to further improve security, the number of times may be set to a number greater than 1. In this case, after one successful movement, the target position may be re-generated randomly, the user may be prompted to move the biological characteristic information according to the above described process, and the distance between the display position and the re-generated target position may be calculated in real time. When the distance between these two positions is smaller than the second predetermined value, it indicates that the movement is successful for a second time. If the predetermined number of times is 2, it may be judged that the user is a living being. It may be understood that if the predetermined number of times is greater than 2, the process may be repeated in accordance with whatever number is used as the predetermined number in order to determine if the number of successful movements by the user satisfies the predetermined number in order to judge whether the user is a living being.

The second predetermined value may be the same as or different from the first predetermined value. In this embodiment, assuming that the second predetermined value is also w/2, and the distance between the display position after the movement and the target position is smaller than w/2, it may be determined that the detected user is a living being. In another aspect, it may be determined whether a face matching is successful.

By calculating, in real time, the distance between the display position after the movement and the target position, it may be timely detected whether the liveness detection or the face matching is successful.

In this embodiment, a determination can be made whether or not the user is a living being using a mapping of the biological characteristic information to the display position on the screen, and based on the relationship between the display position and the target position, such that during user identity authentication, only the biological characteristic information of a living being is verified, which improves security.

Figure 7:
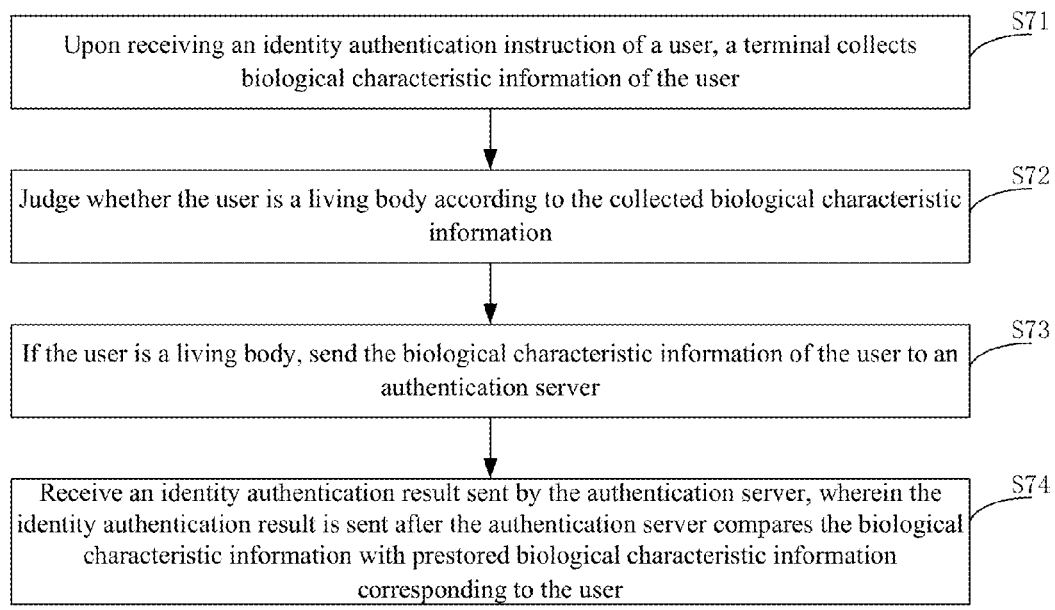
FIG. 7 is a schematic flowchart illustrating an identity authentication method according to an embodiment of the present disclosure.

FIG. 7 is a schematic flowchart illustrating an identity authentication method according to an embodiment of the present disclosure. The method may be performed by a terminal. The method comprises steps S71-S74.

In S71, a terminal collects biological characteristic information of the user in response to receiving a user's identity authentication request.

An identity authentication button on a login interface of the terminal may be clicked by the user to generate an identity authentication request.

Upon receiving the identity authentication instruction generated by the user, the terminal may acquire such biological characteristic information as face information and the like. As discussed hereinabove, the biological characteristic information can be captured using a camera.

In S72, it is judged whether the user is a living being according to the collected biological characteristic information.

In accordance with one or more embodiments, judging whether the user is a living being specifically comprises displaying the collected biological characteristic information of the user at an initial position on a screen of the terminal; determining a target position according to the initial position, and displaying the target position on the screen; prompting the user to move the biological characteristic information, such that a display position of the biological characteristic information on the screen moves from the initial position to the target position; and detecting the display position of the biological characteristic information on the screen after the movement, and judging whether the user is a living being according to a relationship between the display position and the target position.

Liveness detection details found elsewhere in the disclosure, such as and without limitation liveness detection details provided in connection with one or more embodiments described hereinabove, are not repeated here in connection with FIG. 7; however, such liveness detection details may also be applicable to the embodiment of FIG. 7.

In S73, if the user is a living being, the biological characteristic information of the user is sent to an authentication server. The biological characteristic information sent to the authentication server may be obtained by selecting from a plurality of pieces of biological characteristic information.

Figure 8:
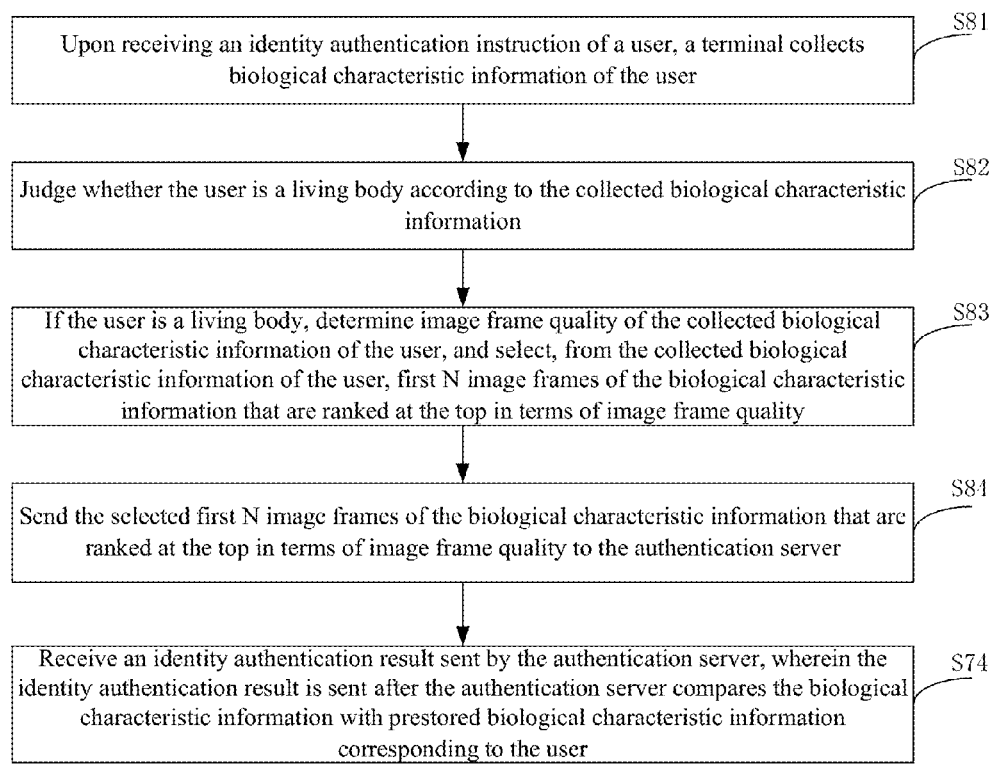
FIG. 8 is a schematic flowchart illustrating an identity authentication method according to an embodiment of the present disclosure.

Optionally and with reference to FIG. 8, in another embodiment, the identity authentication method comprises steps S81-S84 and S74 shown in FIG. 8.

In S81, upon receiving an identity authentication instruction of a user, a terminal collects biological characteristic information of the user.

As illustrated above, after the terminal prompts the user to move, the user may move the user's head, and while the user is moving the user's head, the terminal may capture pictures of the face of the user in real time, so as to acquire a plurality of face pictures. The plurality of pictures of the user's face may be pictures of the user's face captured in real time by the terminal during the period between the prompt to move and confirmation of a successful face matching (that is, determination that the user is a living being).

In S82, it is judged whether the user is a living being according to the collected biological characteristic information.

Liveness detection details found elsewhere in the disclosure, such as and without limitation liveness detection details provided in connection with one or more embodiments described hereinabove, are not repeated here in connection with FIG. 8; however, such liveness detection details may also be applicable to the embodiment of FIG. 8.

In S83, if the user is a living being, image frame quality of the collected biological characteristic information of the user is determined, and a first N image frames of the biological characteristic information that are ranked at the top in terms of image frame quality are selected from the collected biological characteristic information of the user; wherein N is a predetermined positive integer.

Different measurement algorithms for estimating quality may be used in accordance with different biological characteristic information whose corresponding quality is to be estimated. Using face pictures as an example, the quality of the images may be measured according to gesture (whether the face faces to the front), light (whether the light on the face is sufficient), facial expression (whether there is any facial expression) and the like.

A specific measurement algorithm may be defined according to actual needs. For example, weights may be assigned to the various parameters (the gesture, light and facial expression), and each parameter's value may be weighted by multiplying it by its respective weight. The image frame quality of each face picture can be determined to be the aggregate of the weighted parameter values, e.g., the values after the multiplication are added together to obtain the value of the image frame quality of each face picture. The face pictures can be ordered, e.g., in descending order, according to image frame quality, where each picture's image quality is an aggregate of the picture's weighted parameter values. A number, N, pictures can be selected based on the ordering, e.g., the descending order of the image frame quality values. By way of example and assuming that the value of N is 1, the picture at the top of the order, e.g., the picture with the maximum value, is selected.

In S84, the selected first N image frames of the biological characteristic information that are ranked at the top in terms of image frame quality are sent to the authentication server.

For example, after a face picture whose image frame quality is ranked at the first place is selected, the face picture is sent to the authentication server.

In S74, an identity authentication result sent by the authentication server is received, wherein the identity authentication result is sent after the authentication server compares the biological characteristic information with pre-stored biological characteristic information corresponding to the user.

When sending face pictures, the terminal may also send user identifier information. The authentication server pre-stores a relationship between the user identifier information and the face pictures. Upon receiving the user identifier information and the face pictures sent by the terminal, the authentication server may acquire the pre-stored face pictures according to the user identifier information, and compare the received face pictures with the pre-stored face pictures to obtain an identity authentication result.

A face picture comparison may be conducted using an existing algorithm, for example, a face comparison algorithm, which is based on deep learning, or a face comparison algorithm, which is based on a high dimensional feature.

Upon acquiring the identity authentication result, the server may send the identity authentication result to the terminal. Upon receiving the identity authentication result, the terminal displays the result to the user. When the identity authentication is successful, the user is allowed to log in; otherwise, the user's login fails.

In addition, if the terminal sends a plurality of pictures to the authentication server, the authentication server may compare the received pictures with the pre-stored pictures one by one. If one of the received pictures matches the pre-stored picture through comparison, it indicates that the authentication is successful.

As provided above, a verification process can be performed after the user is determined to be a living being, e.g., after the display position and the target position are determined to match indicating that the user is a living being in connection with liveness detection.

In another aspect and in accordance with at least one embodiment, when a determination is made that there is no living being, e.g., the display position and the target position do not satisfactorily match indicating the absence of a living being in connection with liveness detection, the terminal directly returns information indicative of unsuccessful identity authentication to the user, with no need to attain verification from the authentication server.

In this embodiment, liveness detection is performed before identity authentication, and when the user is a living being, further verification is conducted, which prevents spoofing of verification information in the form of photos and the like, and thus improves security during the authentication.

Figure 9:
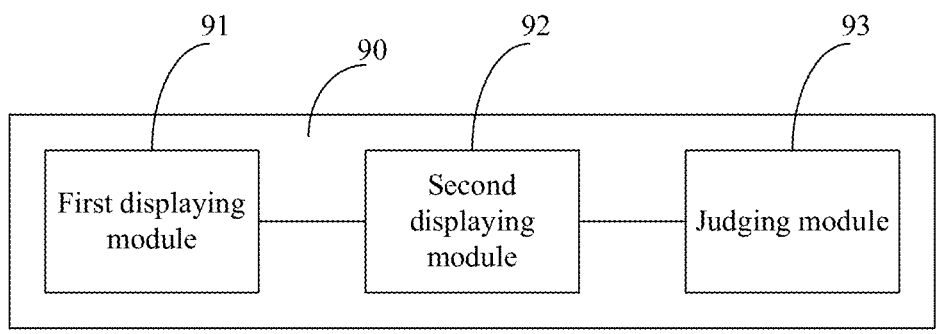
FIG. 9 is a schematic structural diagram illustrating a liveness detection device according to an embodiment of the present disclosure.

FIG. 9 is a schematic structural diagram illustrating a liveness detection device 90 according to an embodiment of the present disclosure. The device may be configured on a terminal, such as a mobile phone or the like. The device 90 comprises: a first displaying module 91, a second displaying module 92, a prompting module 93, and a judging module 94.

The first displaying module 91 is configured to collect biological characteristic information of a user, and display the biological characteristic information at an initial position on a screen of a terminal.

In this embodiment, a case in which the biological characteristic information is face information is used as an example. It may be understood that the biological characteristic information is not limited to face information, and may also be fingerprints, palm prints, irises or the like.

In this embodiment, using face gesture information as an example, the face gesture information is indicated by pitch, roll and yaw, wherein pitch denotes an angle of pitch, roll denotes an angle of rotation, and yaw denotes an angle of oscillation.

For example and with reference to FIG. 2, the coordinates system in which the face is located may be referred to as a first coordinates system, which is a three-dimensional coordinate system. Assume that the head of a person is taken as a three-dimensional sphere, then the central point of the sphere may be selected as the coordinate origin of the first coordinate system. The three coordinate axis of the first coordinate system are respectively X-axis, Y-axis and Z-axis, wherein the positive direction of X-axis is horizontally to the right, the positive direction of Y-axis is vertically upward, and the positive direction of Z-axis is the direction in which human eyes are looking forward. Within the first coordinate system as illustrated in FIG. 2, when the face faces the front horizontally, the pitch, roll and yaw in the face gesture information are all 0 degrees.

Optionally, displaying the biological characteristic information at an initial position on a screen of a terminal by the first displaying module 91 comprises determining a key region of the collected biological characteristic information of the user, detecting the feast region from the face pictures using a face detection algorithm, determining a face region as a key region, estimating a three-dimensional sphere corresponding to a person's head using the face key points and a three-dimensional head modeling algorithm, coordinate mapping is performed according to the initial gesture, and the biological characteristic information is mapped to the initial position on the screen of the terminal.

Using a case in which the biological characteristic information is face information as an example, a camera of the terminal may be used to pick up pictures of the user's face to obtain face pictures. For example, when the user enters a login interface that uses face information, the system automatically captures, or prompts the user to manually capture a number of face pictures.

Afterwards, a face region is detected from the face pictures using a face detection algorithm. The face detection algorithm may be an existing algorithm, such as and for example, a face detection algorithm based on a cascade classifier comprising a plurality of functions connected in a series. Assume for the sake of an example that the cascade classifier comprises a first function, a second function and the like, some of the pictures are eliminated by the first function, with the remaining images not eliminated by the first function being evaluated using the second function, which can eliminate some of the remaining pictures, and so on. Using a cascade classifier comprising a plurality of functions connected in a series, images that do not include an image of a face are eliminated and the remaining images include a facial image. It may be understood that a conventional cascade classifier can be used in connection with embodiments of the present disclosure.

After a face region is detected, the face region is identified as the key region. An initial gesture of the biological characteristic information is obtained via calculation using biological characteristic information within the key region.

Face gesture estimation is performed with respect to the face region to acquire the initial gesture of the face, wherein the initial gesture comprises an initial value of the following at least one angle of a pitch, a roll and a yaw.

After the face region is detected, key points in the face region may be obtained using a face key point positioning algorithm. Key points of a face are characteristic points of the face, such as eyes, a nose, a mouth, and the like. The face key point positioning algorithm can use a method of machine learning comprising a training stage and a positioning stage. In the training stage, a regression machine is trained to estimate face key point coordinates using a training data set of face key point coordinates and corresponding face pictures. In the positioning stage, face key point coordinates are estimated from input face pictures using the trained regression machine. Any suitable face key point positioning algorithm may be used with embodiments of the present disclosure.

After face key points are positioned, a three-dimensional sphere corresponding to a person's head is estimated using the face key points and a three-dimensional head modeling algorithm. Any suitable three-dimensional modeling algorithm may be used with embodiments of the present disclosure. For example, a three-dimensional modeling based on a single picture, a real-time three-dimensional modeling and the like may be used with embodiments of the present disclosure. After the three-dimensional sphere is estimated, an angle of rotation relative to the X-axis is a pitch, an angle of rotation relative to the Y-axis is a yaw, and an angle of rotation relative to the Z-axis is a roll. Initial gesture information is thereby obtained.

Coordinate mapping is performed according to the initial gesture information, and the biological characteristic information is mapped to the initial position on the screen of the terminal.

Optionally, the coordinate mapping is performed according to the initial gesture information, and the mapping of the biological characteristic information to the initial position on the screen of the terminal by the first displaying module 91 comprises acquiring a mapping relationship between coordinates within a first coordinate system and coordinates within a second coordinate system, wherein the first coordinate system is a coordinate system where the biological characteristic information is located, and the second coordinate system is a coordinate system where the screen is located, determining coordinates of the initial position corresponding to the initial gesture according to the mapping relationship; and mapping the biological characteristic information to the initial position according to the coordinates of the initial position.

Both the initial position and the display position after the subsequent movement of the biological characteristic information may be obtained from a pre-established mapping relationship between the first coordinate system and the second coordinate system, wherein the first coordinate system is a coordinate system where the biological characteristic information is located, as illustrated in FIG. 2, and the second coordinate system is a coordinate system where the screen is located.

Referring to FIG. 4, the second coordinate system is a two-dimensional coordinate system. Using a case in which the terminal is a mobile phone as an example, the coordinate origin of the second coordinate system is a central, or center, point of the screen of the mobile phone, the two coordinate axes of the second coordinate system are respectively an X-axis and a Y-axis. The direction of X-axis is consistent with the direction of X-axis in the first coordinate system, and the positive direction of Y-axis is vertically downward.

In this embodiment, two angles of the above described three angles are used. In the two coordinate systems illustrated in FIG. 2 and FIG. 4, the mapping relationship between the two coordinate systems may be represented using the following formulae:

$$\Delta x = S_x \times \sin(\text{yaw}), \Delta y = S_y \times \sin(\text{pitch}); \quad \text{Formulae(1)}$$

In formulae (1), yaw and pitch are from the gesture information of the face information in the first coordinate system. Yaw and pitch are, respectively, an angle of oscillation and an angle of pitch. The variables $\Delta x$, $\Delta y$ are offsets of the display position of the face information on the screen relative to the coordinate origin of the second coordinate system.

The values of $S_x$, $S_y$ are determined by a variation range of the face gesture angle and the height of the screen. The values of $S_x$, $S_y$ can be obtained using the following formulae, where a screen's width and height of the screen are respectively w and h, and the coordinate origin of the coordinate system of the screen is (w/2, h/2), which is the central position of the screen, a variation range of the angle of pitch of the face is $[-\theta, +\theta]$ and a variation range of the angle of oscillation is $[-\beta, +\beta]$. The values of $\theta, \beta$ are configurable, which, in accordance with at least one embodiment, the values may be configured to be set to 45 degrees, e.g., $\theta = \beta = 45°$.

$$S_x = \sin(\beta) \times \frac{w}{2}, S_y = \sin(\theta) \times \frac{h}{2} \quad \text{Formulae (2)}$$

Using formulae (1) and (2), a corresponding display position $(\Delta x, \Delta y)$ may be obtained from gesture information, e.g., yaw, pitch gesture information, and thus the position information $(O_x+\Delta x, O_y+\Delta y)$ corresponding to the status information may be obtained according to the coordinate origin $(O_x, O_y)$ of the second coordinate system.

For example, after an initial position is determined, the face information may be displayed at the initial position.

It may be understood that the above described manner of selecting a coordinate origin, and the selections of the directions of various coordinate axes in the coordinate system are not limited to the above description. Instead, other coordinate origins or coordinate axes in other directions may be used. Correspondingly, when the coordinate origin or the direction of a coordinate axis changes, the above calculation formulae may be adjusted according to a spatial geometrical relationship between the two coordinate systems.

The second displaying module 92 is configured to determine a target position according to the initial position, and display the target position on the screen. The target position may be generated randomly. Generating the target position randomly reduces the probability that the target position can be predicted, and improve accuracy of liveness detection.

Optionally, determining a target position, by the generating module 92, according to an initial position comprises randomly generating a candidate target position; judging whether the candidate target position and the initial position satisfy a predetermined condition; and when the predetermined condition is satisfied, determining the candidate target position as the target position. For example, the coordinate values in the X and Y directions can be randomly generated using a random coordinate value generator algorithm, and the candidate target position is defined by the randomly generated coordinate values in the X and Y directions.

Optionally, judging whether the candidate target position and the initial position satisfy a predetermined condition by the generating module comprises calculating a distance between the candidate target position and the initial position; judging whether the distance is smaller than a first predetermined value; if the distance is smaller than the first predetermined value, re-generating a candidate target position until the distance is greater than or equal to the first predetermined value; and when the distance is greater than or equal to the first predetermined value, judging that the candidate target position and the initial position satisfy the predetermined condition.

Since the candidate target position and the initial position may each be indicated by a point within the second coordinate system, the distance between the candidate target position and the initial position may be obtained by calculating the distance between the two points in a two-dimensional plane.

The first predetermined value may be, for example, w/2, and a judgment result may be obtained by comparing the distance with w/2.

When generating module 92 determines that the predetermined condition is satisfied, the candidate target position is identified as the target position. For example, the candidate target position with the distance greater than or equal to the first predetermined value is determined to be the target position that is to be used.

The prompting module 93 is configured to prompt the user to move the biological characteristic information, e.g., the display position of the biological characteristic information on the screen moves from the initial position to the target position.

After the target position is determined, the terminal may display prompting information to the user. The prompting information is used to prompt the user to move the face information displayed at the current display position to the target position.

After viewing the prompting information, the user may move the displayed image, the image of a face or head, and the display position of the displayed can be continuously moved on the screen in response to the user's input.

In this embodiment, by selecting the target position where a distance between the target position and the initial position is greater than a predetermined value, the target position is distinguished from the initial position in terms of position, which makes it easier for the user to move the biological characteristic, such as an image of the user's face or head.

FIG. 6 illustrates the relationship between the target position and the initial position using a face image as an example.

The judging module 93 of FIG. 9 is configured to detect the display position of the biological characteristic information on the screen after the movement, and judge whether the user is a living being according to a relationship between the display position and the target position.

As described above, the display position of the biological characteristic information after the biological characteristic is moved on the screen by the user may be obtained using a method similar to the method for calculating the initial position.

Optionally, calculating the display position of the biological characteristic information after the movement on the screen by the judging module 93 comprises acquiring gesture information of the biological characteristic information after the movement within a first coordinate system; and using a pre-established mapping relationship between coordinates within a first coordinate system and coordinates within a second coordinate system to calculate coordinates within the second coordinate system corresponding to the gesture information within the first coordinate system, and determining a display position of the biological characteristic information after the movement on the screen according to the coordinates within the second coordinate system. The first coordinate system can be a coordinate system of the biological characteristic information, and the second coordinate system can be a coordinate system of the screen.

For example, when the user moves the user's head, the face gesture information may be changed. In accordance with the pre-established mapping relationship between the first coordinate system and the second coordinate system, the variable $\Delta x$, $\Delta y$ may be determined using formulae (1) and (2). A display position of the face on the screen, which is variable, can be obtained using $\Delta x$, $\Delta y$ and the coordinate origin.

In addition, after the display position of the face on the screen is calculated in real time, the face information may be displayed at the corresponding position according to the display information calculated in real time. In so doing, the user is able to move the face information to the target position in real time.

Using the mapping relationship between the first coordinate system and the second coordinate system, the face gesture information may be mapped to the corresponding position on the screen.

Optionally, the display position moves with the movement of the biological characteristic information by the user, wherein the movement of the biological characteristic information drives the display position to move; and judging whether the user is a living being according to a relationship between the display position and the target position comprises judging that the movement is successful when a distance between the display position and the target position is smaller than a second predetermined value, and if a number of times that the user successfully moves the biological characteristic information reaches a predetermined number of times, judging that the user is a living being.

For example, when the user moves a head image, the terminal calculates in real time a corresponding display position after the movement, and calculates in real time a distance between the display position after the movement and the target position, until the distance between these two positions is smaller than the second predetermined value. When the distance between the two positions is smaller than the second predetermined value, it indicates that the movement is successful, and the number of successful times is set to 1. If the predetermined number of times is 1, after one successful movement, it may be judged that the user is a living being.

Alternatively, to further improve security, the number of times may be set to a number greater than 1. In this case, after one successful movement, the target position may be re-generated randomly, the user may be prompted to move the biological characteristic information according to the above described process, and the distance between the display position and the re-generated target position may be calculated in real time. When the distance between these two positions is smaller than the second predetermined value, it indicates that the movement is successful for a second time. If the predetermined number of times is 2, it may be judged that the user is a living being. It may be understood that if the predetermined number of times is greater than 2, the process may be repeated in accordance with whatever number is used as the predetermined number in order to determine if the number of successful movements by the user satisfies the predetermined number in order to judge whether the user is a living being.

The second predetermined value may be the same as or different from the first predetermined value. In this embodiment, assuming that the second predetermined value is also w/2, and the distance between the display position after the movement and the target position is smaller than w/2, it may be determined that the detected user is a living being. In another aspect, it may be determined whether a face matching is successful.

By calculating, in real time, the distance between the display position after the movement and the target position, it may be timely detected whether the liveness detection or the face matching is successful.

In this embodiment, a determination can be made whether or not the user is a living being using a mapping of the biological characteristic information to the display position on the screen, and based on the relationship between the display position and the target position, such that during user identity authentication, only the biological characteristic information of a living being is verified, which improves security.

Figure 10:
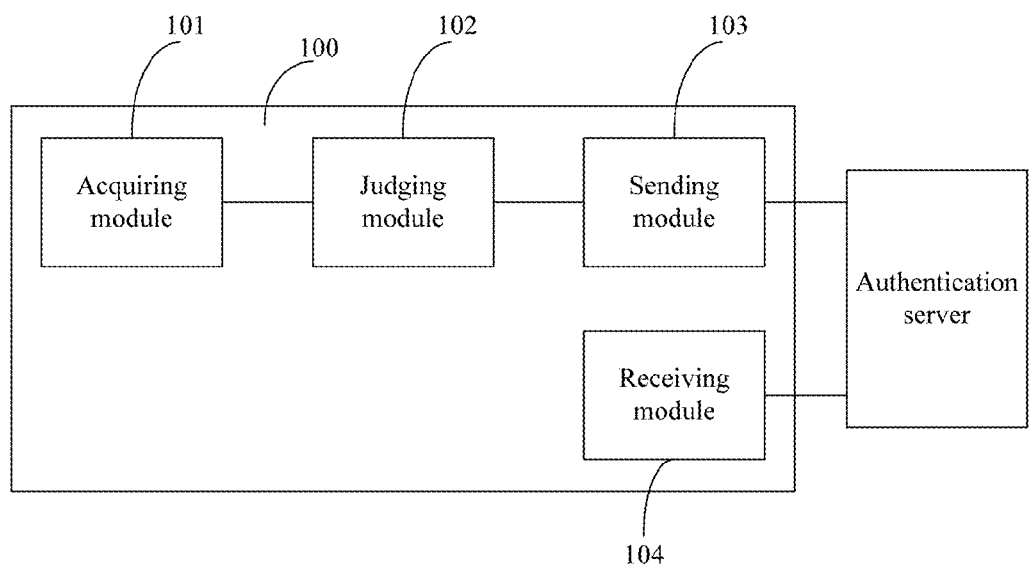
FIG. 10 is a schematic structural diagram illustrating an identity authentication device according to an embodiment of the present disclosure.

FIG. 10 is a schematic structural diagram illustrating an identity authentication device 100 according to an embodiment of the present disclosure. The device may be configured on a terminal, such as a mobile phone or the like. The device comprises: an acquiring module 101, a judging module 102, a sending module 103, and a receiving module 104.

The acquiring module 101 is configured to, upon receiving a user's identity authentication request, collect biological characteristic information of the user. When the user wishes to invoke identity authentication, an identity authentication button on a login interface of the terminal may be clicked to generate an identity authentication request. Upon receiving the identity authentication request generated by the user, the terminal may acquire such biological characteristic information as face information and the like.

The judging module 102 is configured to judge whether the user is a living being according to the collected biological characteristic information.

The judging module 102 is configured to display the collected biological characteristic information of the user at an initial position on a screen of the terminal; determine a target position according to the initial position, and display the target position on the screen; prompt the user to move the biological characteristic information, such that a display position of the biological characteristic information on the screen moves from the initial position to the target position; and detect the display position of the biological characteristic information on the screen after the movement, and judge whether the user is a living being according to a relationship between the display position and the target position.

Liveness detection details found elsewhere in the disclosure, such as and without limitation liveness detection details provided in connection with one or more embodiments described hereinabove, may also be applicable to the embodiment of FIG. 10.

The sending module 103 is configured to send the biological characteristic information of the user to an authentication server if the judging module judges that the user is a living being. The biological characteristic information sent to the authentication server may be obtained by selecting from a plurality of pieces of biological characteristic information.

Optionally, the sending module 103 may be configured to determine image frame quality of the collected biological characteristic information of the user, and select, from the collected biological characteristic information of the user, a first N image frames of the biological characteristic information that are ranked at the top in terms of image frame quality; wherein N is a predetermined positive integer; and send the selected first N image frames of the biological characteristic information that are ranked at the top in terms of image frame quality to the authentication server.

As illustrated above, after the terminal prompts the user to move, the user may move the head, and during the process of moving the head by the user, the terminal may pick up pictures for the face of the user in real time, so as to acquire a plurality of face pictures. The plurality of face pictures may be face pictures picked up in real time by the terminal for the user during the period between the prompt to move and confirmation of successful face matching (that is, determination that the user is a living being).

Afterwards, liveness detection may be performed, wherein the acquisition of a plurality of pieces of biological characteristic information and the process of the liveness detection may be referenced to the above relevant embodiments, which are thus not described herein any further.

Different measurement algorithms for estimating quality may be used in accordance with different biological characteristic information whose corresponding quality is to be estimated. Using face pictures as an example, the quality of the images may be measured according to gesture (whether the face faces to the front), light (whether the light on the face is sufficient), facial expression (whether there is any facial expression) and the like.

A specific measurement algorithm may be defined according to actual needs. For example, weights may be assigned to the various parameters (the gesture, light and facial expression), and each parameter's value may be weighted by multiplying it by its respective weight. The image frame quality of each face picture can be determined to be the aggregate of the weighted parameter values, e.g., the values after the multiplication are added together to obtain the value of the image frame quality of each face picture. The face pictures can be ordered, e.g., in descending order, according to image frame quality, where each picture's image quality is an aggregate of the picture's weighted parameter values. A number, N, pictures can be selected based on the ordering, e.g., the descending order of the image frame quality values. By way of example and assuming that the value of N is 1, the picture at the top of the order, e.g., the picture with the maximum value, is selected. For example, after a face picture whose image frame quality is ranked in first place is selected, the face picture is sent to the authentication server.

The receiving module 104 is configured to receive an identity authentication result sent by the authentication server, the identity authentication result being sent after the authentication server compares the biological characteristic information with pre-stored biological characteristic information corresponding to the user.

When sending face pictures, the terminal may also send user identifier information. The authentication server pre-stores a relationship between the user identifier information and the face pictures. Upon receiving the user identifier information and the face pictures sent by the terminal, the authentication server may acquire the pre-stored face pictures according to the user identifier information, and compare the received face pictures with the pre-stored face pictures to obtain an identity authentication result.

A face picture comparison may be conducted using the existing algorithm, for example, a face comparison algorithm based on deep learning, or a face comparison algorithm based on a high dimensional feature.

Upon acquiring the identity authentication result, the server may send the identity authentication result to the terminal. Upon receiving the identity authentication result, the terminal displays the result to the user. When the identity authentication is successful, the user is allowed to log in; otherwise, the user's login fails.

In addition, if the terminal sends a plurality of pictures to the authentication server, the authentication server may compare the received pictures with the pre-stored pictures one by one. If one of the received pictures matches the pre-stored picture through comparison, it indicates that the authentication is successful.

As provided above, a verification process can be performed after the user is determined to be a living being, e.g., after the display position and the target position are determined to match indicating that the user is a living being in connection with liveness detection.

In another aspect and in accordance with at least one embodiment, when a determination is made that there is no living being, e.g., the display position and the target position do not satisfactorily match indicating the absence of a living being in connection with liveness detection, the terminal directly returns information indicative of unsuccessful identity authentication to the user, with no need to attain verification from the authentication server.

In this embodiment, liveness detection is performed before identity authentication, and when the user is a living being, further verification is conducted, which prevents spoofing of verification information in the form of photos and the like, and thus improves security during the authentication.

It should be noted that terms such as "a first", "a second", and the like are merely used for illustration purposes in the present disclosure, and shall not be understood as indicating or implying relative importance. In addition and in the present disclosure, the meaning of "multiple" or "a plurality of" refers to at least two unless otherwise specified.

Any process or method description illustrated in the flowcharts or described herein in any manner may be understood as including one or a plurality of modules, segments or portions of code comprising executable instructions for implementing specific logic functions or steps in the processes. In addition, the scope of the preferred embodiments of the present disclosure covers other implementations. The implementation of the functions or steps may not be limited to the illustrated or discussed sequence; however, the functions may be implemented in a substantially simultaneous manner or in a contrary sequence, which shall be understood by a person skilled in the art according to the embodiments of the present disclosure.

It should be understood that each part of the present disclosure may be implemented using hardware, software, firmware or a combination thereof. In the above embodiments, the multiple steps or methods may be implemented using software or firmware which is stored in a memory and executed by a suitable instruction execution system. For example, if the multiple steps or methods are implemented using hardware, similar to another embodiment, the steps or methods may be implemented using any one or a combination of the following technologies that are commonly known in the art: a discrete logic circuit of a logic gate circuit configured to implement a logic function in accordance with data signals, an application specific integrated circuit having a suitable combinational logic gate, a programmable gate array (PGA), a field-programmable gate array (FPGA), and the like.

Persons of ordinary skill in the art understand that all or part of the steps of the methods in the embodiments may be implemented by a program instructing relevant hardware. The program may be stored in a computer readable storage medium. When the program runs, one of the steps or a combination of them is included in the method embodiments.

In addition, various function units according to embodiments of the present disclosure may be integrated in a processing module, or may each be independent, physical units; alternatively, two or more units may be integrated in a module. The above integrated module may be implemented using hardware, and may also be implemented using a software function module. If the integrated module is implemented using the software function module, and is sold or used as an independent product, the integrated module may also be stored in a computer readable storage medium.

The above mentioned storage medium may be a read only memory, a magnetic disk, a compact disc-read only memory or the like.

In the description of the present specification, reference terms such as "an embodiment", "some embodiments", "examples", "specific examples", "some examples", or the like are intended to indicate that the specific features, structures, materials, or characteristics which are described in combination with the embodiments or examples are comprised in at least one embodiment or example of the present disclosure. In this specification, schematic expressions of the above terms do not necessarily indicate the same embodiments or examples. In addition, the described specific features, structures, materials, or characteristics may be combined in any one or multiple embodiments or examples in a suitable way.

Although the above description illustrates embodiments of the present disclosure, it can be understood that the embodiments are merely exemplary, and shall not be construed as limitations to the present disclosure. Persons of ordinary skill in the art may derive variations, modifications, and replacements to the above embodiments within the scope of the present disclosure.

The invention claimed is:

1. A method for identity verification using facial information comprising:
   collecting, by a computing device, biological characteristic information of a user;
   displaying, by the computing device, the collected biological characteristic information at an initial position on a screen of the computing device;
   determining, by the computing device, a target position using the initial position, and displaying the target position on the screen
   randomly generating, by the computing device, a candidate target position based on the initial position;
   using, by the computing device, the candidate target position as a target position upon determining that the candidate target position and the initial position satisfy a predetermined condition;
   displaying, by the computing device, the target position on the screen;
   prompting, by the computing device, the user to move the user's biological characteristic information to cause the displayed biological characteristic to move from the initial position on the screen to the target position on the screen;
   detecting, by the computing device, the user's biological characteristic information movement, and determining the display position of the displayed biological characteristic information using the detected user's movement; and
   judging, by the computing device, whether the user is a living being using a relationship between the determined display position and the target position.

2. The method of claim 1, displaying the collected biological characteristic information at an initial position on a screen of the computing device comprising:
   determining, by the computing device, a key region of the collected biological characteristic information of the user;
   obtaining, by the computing device and using collected biological characteristic information within the key region, an initial gesture of the collected biological characteristic information; and
   performing, by the computing device, a coordinate mapping using the initial gesture, and mapping the collected biological characteristic information to the initial position on the screen of the computing device.

3. The method of claim 2, performing coordinate mapping using the initial gesture and mapping the collected biological characteristic information to the initial position on the screen of the computing device comprising:
   acquiring, by the computing device, a mapping relationship between coordinates of a first coordinate system and coordinates of a second coordinate system, the first coordinate system for use with the biological characteristic information of the user, and the second coordinate system for use with the computing device's screen;
   determining coordinates of the initial position corresponding to the initial gesture using the mapping relationship; and
   mapping the at least a portion of the collected biological characteristic information to the initial position using the coordinates of the initial position.

4. The method of claim 1, judging whether the determining that the candidate target position and the initial position satisfy a predetermined condition comprising:
   calculating, by the computing device, a distance between the candidate target position and the initial position;
   judging, by the computing device, whether the distance is smaller than a first predetermined value;
   if the distance is smaller than the first predetermined value, re-generating, by the computing device, a candidate target position until the distance is greater than or equal to the first predetermined value; and
   when the distance is greater than or equal to the first predetermined value, judging, by the computing device, that the candidate target position and the initial position satisfy the predetermined condition.

5. The method of claim 1, judging whether the user is a living being using a relationship between the display position and the target position comprising:
   when a distance between the display position and the target position is smaller than a second predetermined value, judging that the user successfully moved the displayed biological characteristic;
   if a number of times that the user is judged to have successfully moved the displayed biological characteristic reaches a predetermined number of times, judging that the user is a living being.

6. The method of claim 1, determining the display position of the displayed biological characteristic information using the detected user's movement comprising:
   acquiring gesture information of the biological characteristic information's movement by the user in response to detecting the user's movement, the gesture information being in a first coordinate system;
   using a pre-established mapping relationship between coordinates within the first coordinate system and coordinates within a second coordinate system to calculate coordinates within the second coordinate system corresponding to the gesture information in the first coordinate system; and
   determining the display position on the screen of the displayed biological characteristic information using the calculated coordinates in the second coordinate system, the first coordinate system is a coordinate system for use with the user's biological characteristic information, and the second coordinate system is a coordinate system for use with the screen.

7. The method of claim 1, the user's biological characteristic information is face information.

8. A method for identity verification using facial information comprising:
   upon receiving an identity authentication instruction of a user, a computing device collecting biological characteristic information of the user;
   judging, by the computing device, whether the user is a living being according to the collected biological characteristic information;
   if the user is judged to be a living being, the computing device sending the collected biological characteristic information of the user to an authentication server;
   receiving, by the computing device and from the authentication server, an identity authentication result of a comparison of the collected biological characteristic information with prestored biological characteristic information corresponding to the user;

the judging, by the computing device, whether the user is a living being comprising:

displaying at least a portion of the collected biological characteristic information at an initial position on a screen of the computing device;

determining a target position using the initial position, and displaying the target position on the screen;

randomly generating a candidate target position based on the initial position;

using the candidate target position as a target position upon determining that the candidate target position and the initial position satisfy a predetermined condition the candidate target position and the initial position satisfy a predetermined condition;

displaying the target position on the screen;

prompting the user to move the user's biological characteristic information to cause the displayed biological characteristic to move from the initial position on the screen to the target position on the screen;

detecting the user's biological characteristic information movement, and determining the display position of the displayed biological characteristic information using the detected user's movement; and judging whether the user is a living being using a relationship between the determined display position and the target position.

9. The method of claim 8, the sending the collected biological characteristic information of the user to an authentication server comprising:

determining, by the computing device, an image frame quality of the collected biological characteristic information of the user;

selecting, by the computing device and from the collected biological characteristic information of the user, a number of image frames of the collected biological characteristic information ranked at a top in terms of image frame quality, the number being a predetermined positive integer; and sending, by the computing device, the selected number of image frames of the collected biological characteristic information ranked at the top in terms of image frame quality to the authentication server.

10. A device for identity verification using facial information, comprising:

a first displaying module collecting biological characteristic information of a user, and displaying the collected biological characteristic information at an initial position on a screen of a computing device;

a second displaying module randomly generating a candidate target position based on the initial position, using the candidate target position as a target position when the candidate target position and the initial position satisfy a predetermined condition, and displaying the target position on the screen determining a target position using the initial position, and displaying the target position on the screen;

a prompting module prompting the user to move the user's biological characteristic information to cause the displayed biological characteristic to move from the initial position on the screen to the target position on the screen; and a judging module detecting the user's biological characteristic information movement, determining the display position of the displayed biological characteristic information using the detected user's movement, and judging whether the user is a living being using a relationship between the determined display position and the target position.

11. The device of claim 10, the first displaying module displaying the biological characteristic information at an initial position on a screen of a computing device by comprising:

the first displaying module determining a key region of the collected biological characteristic information of the user;

the first displaying module obtaining, via calculation and using biological characteristic information within the key region, an initial gesture of the collected biological characteristic information; and the first displaying module performing a coordinate mapping using the initial gesture, and mapping the collected biological characteristic information to the initial position on the screen of the computing device.

12. The device of claim 11, the first displaying module performing coordinate mapping using the initial gesture and mapping the biological characteristic information to the initial position on the screen of the computing device comprising:

the first displaying module acquiring a mapping relationship between coordinates of a first coordinate system and coordinates of a second coordinate system, the first coordinate system for use with the biological characteristic information of the user, and the second coordinate system for use with the computing device's screen;

the first displaying module determining coordinates of the initial position corresponding to the initial gesture using the mapping relationship; and the first displaying module mapping the at least a portion of the collected biological characteristic information to the initial position using the coordinates of the initial position.

13. The device of claim 10, the second displaying module determining that judging whether the candidate target position and the initial position satisfy a predetermined condition comprising:

the second displaying module calculating a distance between the candidate target position and the initial position;

the second displaying module judging whether the distance is smaller than a first predetermined value;

the second displaying module, if the distance is smaller than the first predetermined value, re-generating a candidate target position until the distance is greater than or equal to the first predetermined value; and the second displaying module, when the distance is greater than or equal to the first predetermined value, judging that the candidate target position and the initial position satisfy the predetermined condition.

14. The device of claim 10, the judging module judging whether the user is a living being using a relationship between the display position and the target position comprising:

the judging module, when a distance between the display position and the target position is smaller than a second predetermined value, judging that the movement is successful; and the judging module, if the number of times of successful movement reaches a predetermined number of times, judging that the user is a living being.

15. The device of claim 10, the judging module determining the display position of the displayed biological characteristic information using the detected user's movement comprising:
- the judging module acquiring gesture information of the biological characteristic information's movement by the user in response to detecting the user's movement, the gesture information being in a first coordinate system;
- the judging module using a pre-established mapping relationship between coordinates within the first coordinate system and coordinates within a second coordinate system to calculate coordinates within the second coordinate system corresponding to the gesture information in the first coordinate system; and
- the judging module determining the display position on the screen of the displayed biological characteristic information using the calculated coordinates in the second coordinate system, the first coordinate system is a coordinate system for use with the user's biological characteristic information, and the second coordinate system is a coordinate system for use with the screen.

16. A device for identity verification using facial information, comprising:
- an acquiring module, upon receiving an identity authentication instruction of a user, collecting biological characteristic information of the user;
- a judging module judging whether the user is a living being according to the collected biological characteristic information;
- a sending module, if the judging module judges that the user is a living being, sending the collected biological characteristic information of the user to an authentication server;
- a receiving module receiving, from the authentication server, an identity authentication result of a comparison of the collected biological characteristic information with prestored biological characteristic information corresponding to the user;
- the judging module judging whether the user is a living being according to the collected biological characteristic information comprising:
  - the judging module displaying at least a portion of the collected biological characteristic information at an initial position on a screen of the computing device;
  - the judging module randomly generating a candidate target position based on the initial position, using the candidate target position as a target position when the candidate target position and the initial position satisfy a predetermined condition, and displaying the target position on the screen determining a target position using the initial position, and displaying the target position on the screen;
  - the judging module prompting the user to move the user's biological characteristic information to cause the displayed biological characteristic to move from the initial position on the screen to the target position on the screen;
  - the judging module detecting the user's biological characteristic information movement, and determining the display position of the displayed biological characteristic information using the detected user's movement; and
  - the judging module judging whether the user is a living being using a relationship between the determined display position and the target position.

17. The device according to claim 16, the sending module sending the collected biological characteristic information of the user to an authentication server comprising:
- the sending module determining an image frame quality of the collected biological characteristic information of the user;
- the sending module selecting, from the collected biological characteristic information of the user, a number of image frames of the collected biological characteristic information ranked at a top in terms of image frame quality, the number being a predetermined positive integer; and
- the sending module sending the selected number of image frames of the collected biological characteristic information ranked at the top in terms of image frame quality to the authentication server.

* * * * *